Feb. 24, 1931.                W. H. BICE                1,793,581
              AIR COOLED VALVE STEM GUIDE AND BUSHING
                        Filed Oct. 8, 1928
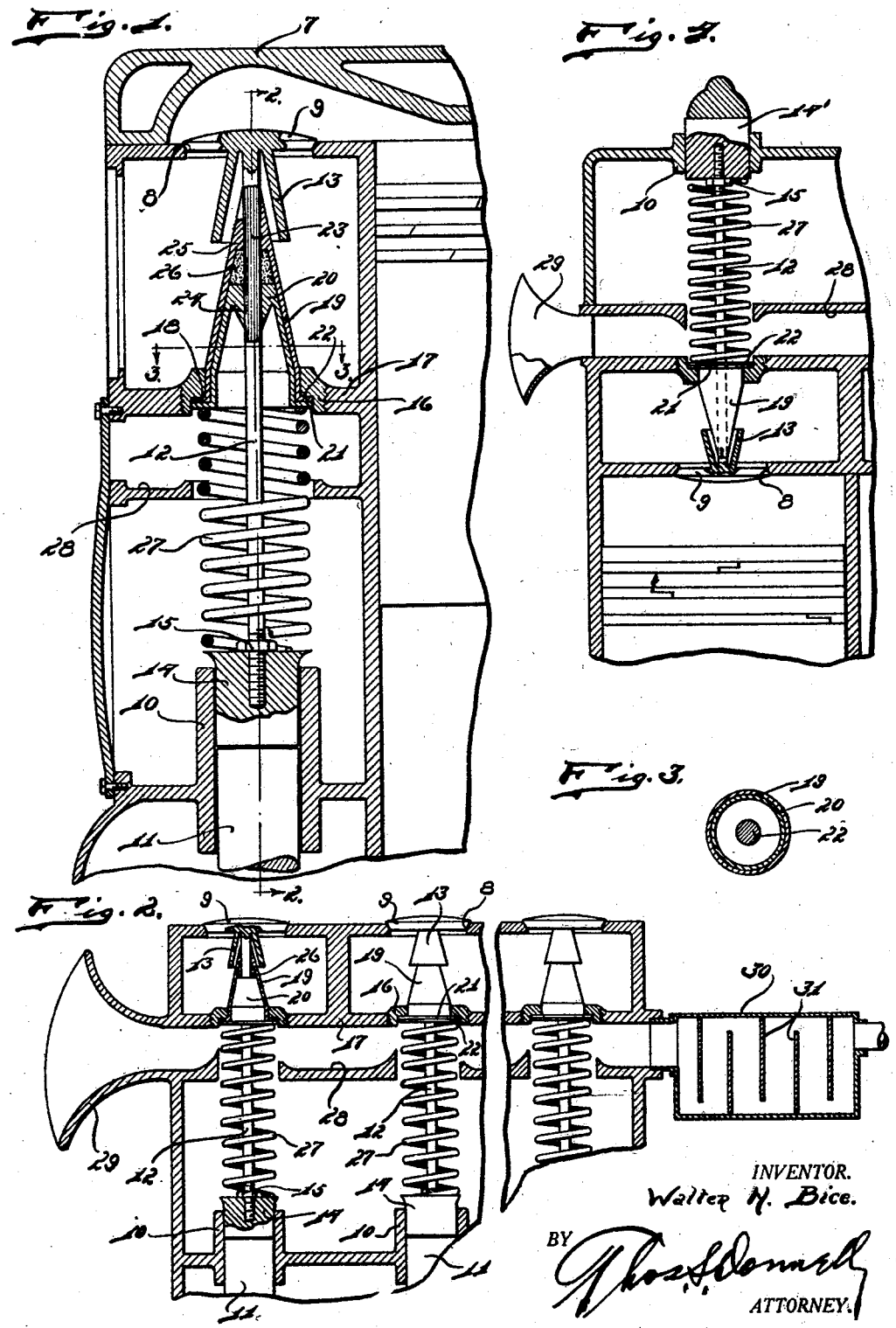
INVENTOR.
Walter H. Bice.
BY
ATTORNEY.

Patented Feb. 24, 1931

1,793,581

UNITED STATES PATENT OFFICE

WALTER H. BICE, OF DETROIT, MICHIGAN

AIR-COOLED VALVE-STEM GUIDE AND BUSHING

Application filed October 3, 1923. Serial No. 310,973.

My invention relates to a new and useful improvement in an air cooled valve stem guide and bushing of a type in which the bushing is self-sealed on the valve stem.

It is an object of the present invention to prevent warping of the valve stems and bushings used therewith.

It is another object of the invention to provide a bushing which may be economically manufactured, which will be durable and highly efficient in use, and which may be easily and quickly assembled.

It is another object of the present invention to provide a bushing of this class whereby currents of air may be led into the engine for cooling purposes.

Other objects will appear hereinafter.

The invention consists in the combination and arrangement of parts hereinafter described and claimed.

The invention will be best understood by a reference to the accompanying drawings which form a part of the specification and in which, Fig. 1 is a central vertical sectional view of the invention applied.

Fig. 2 is a fragmentary sectional view of a multi-cylinder engine showing the invention applied.

Fig. 3 is a sectional view taken on line 3—3 of Fig. 1.

Fig. 4 is a fragmentary sectional view of an overhead type of engine showing the invention applied.

In the drawings I have shown the invention applied to an engine having a head 7 and a port 8 closed by the valve 9 and provided with a push rod guide 10, in which the push rod 11 reciprocates. Projecting from the face of the valve 9 in embracing relation to the valve stem 12, is a conical apron 13. Slidably engaging in the push rod guide 10 is a plug 14, in which is threaded the end of the valve stem 12, which is provided with the lock nut 15, so that adjustment of the valve stem, by moving the plug 14 relatively to the end of the push rod 11, may be effected.

A bushing 16 is threaded on to the inward projection 17 and provided with a recess 18 in which engages the bushing, this bushing comprising the conical member 19 and the conical member 20, each having the outwardly turned flanges 22 and 21, respectively. The valve stem is fluted as at 23, this fluted portion projecting through the head 24 and the head 25, solder 26 or other suitable affixing means being positioned between the heads about the fluted portion of the valve stem. The spring 27 engages the plug 14 and functions in the usual manner. An air conduit or passage 28 is provided with the funnel 29, through which air may be directed by the fan or otherwise so as to pass into the interior of the member 19 for cooling purposes, a baffle 30 with baffles 31 being positioned in the path of the air for retarding its progress.

In disassembling, the bushing 16 may be removed and all of the parts easily and quickly removed, so that a minimum amount of time for assembling and disassembling is required.

In Fig. 4 I have shown the invention applied to the overhead valve type of engine in which the plug 14' functions, as does the plug 14, the rest of the parts being as already described and merely in inverted position.

While I have illustrated and described the preferred form of structure, I do not wish to limit myself to the precise form of structure shown, but desire to avail myself of such variations and modifications as come within the scope of the appended claims.

Having thus described my invention what I claim as new and desire to secure by Letters Patent is:—

1. A device of the class described adapted for use with an engine having a chamber formed therein; a valve stem bushing embracing a valve stem and closed at one end, the open end communicating with said chamber.

2. A device of the class described adapted for use with an engine having an air conduit formed therein comprising a valve stem bushing formed conical and closed at its lower end an embracing said valve stem; the open end of said bushing communicating with said conduit.

3. A valve guide and bushing of the class described comprising a cup shaped bushing;

a head formed at one end of said bushing and serving as a closure therefore and embracing said valve stem; and an outwardly projecting flange at the other end of said bushing.

4. A device of the class described, comprising: a valve stem; a valve stem guide and bushing mounted on said valve stem and comprising a conical member embracing said valve stem, said valve stem being axially slidable therein; and means for preventing rotation of said bushing about said valve stem, the smaller end of said bushing being closed.

5. In combination with a valve having a valve stem: a bushing embracing said stem at one end and being closed, the other end of said bushing being larger in cross sectional area and being open.

In testimony whereof I have signed the foregoing specification.

WALTER H. BICE.